US010417623B2

(12) United States Patent
Whitehouse (10) Patent No.: US 10,417,623 B2
(45) Date of Patent: Sep. 17, 2019

(54) HIGH VOLUME SERIALIZED POSTAGE AT AN AUTOMATED TELLER MACHINE OR OTHER KIOSK

(71) Applicant: PSI SYSTEMS, INC., Palo Alto, CA (US)

(72) Inventor: Harry T. Whitehouse, Portola Valley, CA (US)

(73) Assignee: PSI SYSTEMS, INC., Palo Alto, CA (US)

(\*) Notice: Subject to any disclaimer, the term of this patent is extended or adjusted under 35 U.S.C. 154(b) by 1026 days.

(21) Appl. No.: 14/363,689

(22) PCT Filed: Dec. 6, 2012

(86) PCT No.: PCT/US2012/068090
§ 371 (c)(1),
(2) Date: Jun. 6, 2014

(87) PCT Pub. No.: WO2013/086082
PCT Pub. Date: Jun. 13, 2013

(65) Prior Publication Data
US 2014/0324702 A1  Oct. 30, 2014

Related U.S. Application Data

(60) Provisional application No. 61/567,955, filed on Dec. 7, 2011.

(51) Int. Cl.
*G06Q 20/18* (2012.01)
*G07B 17/00* (2006.01)
(Continued)

(52) U.S. Cl.
CPC ............ *G06Q 20/18* (2013.01); *G06F 21/31* (2013.01); *G06Q 20/40* (2013.01);
(Continued)

(58) Field of Classification Search
USPC ......................................................... 705/330
See application file for complete search history.

(56) References Cited

U.S. PATENT DOCUMENTS 5,319,562 A   6/1994  Whitehouse
6,005,945 A   12/1999  Whitehouse
(Continued)

OTHER PUBLICATIONS

Helping Tickemaster: Changing the Economics of Tickets Robots with Geographic Proof-of-Work by Edward Kaiser and Wu-Chang Feng (Year:2010).*

(Continued)

*Primary Examiner* — Brian M Epstein
*Assistant Examiner* — Zeina Elchanti
(74) *Attorney, Agent, or Firm* — Pillsbury Winthrop Shaw Pittman LLP (57) ABSTRACT

A system and method for retrieving a plurality of indicia are described. The method includes receiving, by a computer system associated with a postage provider a request from a user, the request including a number of the plurality of indicia, and a monetary value of each of the plurality of indicia; and authenticating the request. The method further includes verifying whether sufficient funds exist in an account of the user for the number and monetary value of the plurality of requested indicia. If the request is found authentic and the computer system determines that sufficient funds exist in the account of the user for the number and monetary value of the requested indicia, extracting the plurality of indicia. The method further includes assembling in a return message the plurality of indicia as at least one binary data message; and transmitting the message to a computer associated with the user.

20 Claims, 5 Drawing Sheets

(51) Int. Cl.
 *G06Q 20/40* (2012.01)
 *G06F 21/31* (2013.01)

(52) U.S. Cl.
 CPC ... *G07B 17/00024* (2013.01); *G06Q 2250/70* (2013.01); *G07B 17/0008* (2013.01); *G07B 17/00435* (2013.01); *G07B 2017/00064* (2013.01); *G07B 2017/00225* (2013.01)

(56) References Cited

U.S. PATENT DOCUMENTS

| | | | | |
|---|---|---|---|---|
| 6,085,181 | A * | 7/2000 | Gravell | G07B 17/0008 705/408 |
| 6,341,304 | B1 * | 1/2002 | Engbersen | G06F 17/30902 707/E17.12 |
| 7,194,957 | B1 * | 3/2007 | Leon | B41J 11/42 101/483 |
| 2002/0046195 | A1 * | 4/2002 | Martin | B41J 11/42 705/401 |
| 2003/0074325 | A1 * | 4/2003 | Ryan, Jr. | G07B 17/00024 705/60 |
| 2003/0101143 | A1 * | 5/2003 | Montgomery | G07B 17/00435 705/62 |
| 2003/0101148 | A1 * | 5/2003 | Montgomery | G07B 17/00508 705/404 |
| 2005/0075991 | A1 * | 4/2005 | Ogg | G07B 17/00733 705/408 |
| 2005/0144145 | A1 * | 6/2005 | Ogg | G06Q 10/0833 705/404 |
| 2006/0259444 | A1 * | 11/2006 | Obrea | G06Q 10/087 705/401 |

OTHER PUBLICATIONS

International Search Report and Written Opinion issued for International Application No. PCT/US2012/068090, dated Feb. 25, 2013.

* cited by examiner

FIG. 1
(CONVENTIONAL)

FIG. 2

FIG. 3
(CONVENTIONAL)

FIG. 4
(CONVENTIONAL)

HIGH VOLUME SERIALIZED POSTAGE AT AN AUTOMATED TELLER MACHINE OR OTHER KIOSK

CROSS REFERENCE TO RELATED APPLICATIONS

This application is the U.S. National Stage of PCT/US2012/068090, filed Dec. 6, 2012, which in turn is based on and claims priority to U.S. Provisional Patent Application No. 61/567,955, filed on Dec. 7, 2011. The contents of these applications are incorporated herein by reference in their entirety.

FIELD OF THE INVENTION

The present invention is directed generally to computer system and methods and in particular to high volume serialized postage at an automated teller machine or other kiosk.

BACKGROUND

Serialized internet-based postage systems described in U.S. Pat. Nos. 5,319,562 and 6,005,945 to Whitehouse have revolutionized the US Postal Service. In 2011, over 3 billion dollars in postage is generated using the technology described in these patents, reflecting an annual growth rate of over 20%. This amount represents about 6% of the total US Postal Service revenue. In contrast, older methods of postage evidencing have been on the decline for 5 or more years. Serialized postage is both more accessible to the end user because it is internet-based, and more secure (from the standpoint of revenue protection and Homeland Security) as each stamp carries unique serial and account numbers. The unique serial and account numbers can be, for example, in the form of barcodes.

One limitation of internet-based postage is the time it takes for a single postage transaction. The postage server cluster itself that creates the indicium is relatively fast, taking typically less than 100 milliseconds to create a serialized, digitally-signed indicium. However, each indicium is obtained via an internet transaction which may consume one or more seconds. The one or more seconds are attributable to internet transmission latency. A typical Hypertext Transfer Protocol Secure (HTTPS) message often traverses 10 or 20 intermediary routing computer servers and do this in both directions. Each routing computer server typically consumes about 20 milliseconds to about 60 milliseconds.

Certain postage transactions (e.g., shipping labels) are not as impacted by this latency, as the process of inputting address data and printing a shipping label takes a much longer time than the one or more second messaging for the indicium. However, if one is printing a simple stamp, the stamp not being associated with a specific address, the one or more second communication process becomes a noticeable delay. If one is printing more than one stamp (e.g., a sheet of 12 or 25 stamps), the communications delay becomes even more pronounced. Indeed, in this case, the delay may approach a minute for a sheet of 25 stamps.

Figure 1:
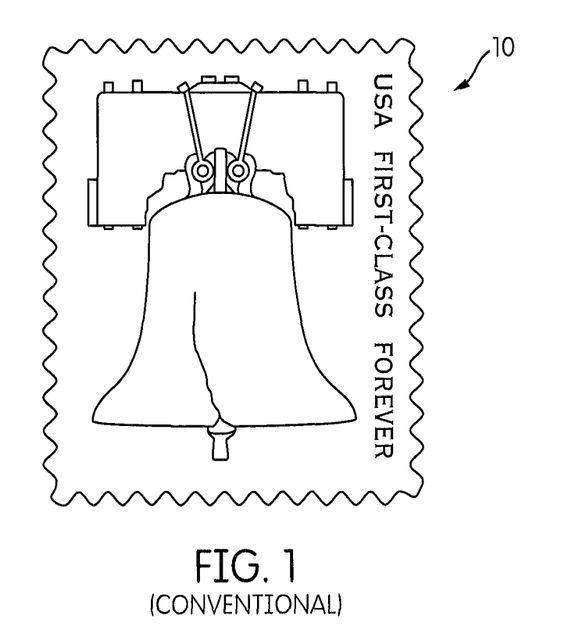
FIG. 1 depicts a conventional postage stamp.

Conventional stamps, such as the stamp 10 shown 10 FIG. 1, are printed by contractors to the US Postal Service. Since these stamps (e.g., stamp 10) are not serialized, they must be manufactured in a secure plant which has a full time United States Postal Service (USPS) Inspector on site. When shipped from these plants, the trucks carrying these physical stamps must be escorted by armed guards. This type of stamp (e.g., stamp 10) is subject to theft, counterfeiting, and re-use.

Figure 4:
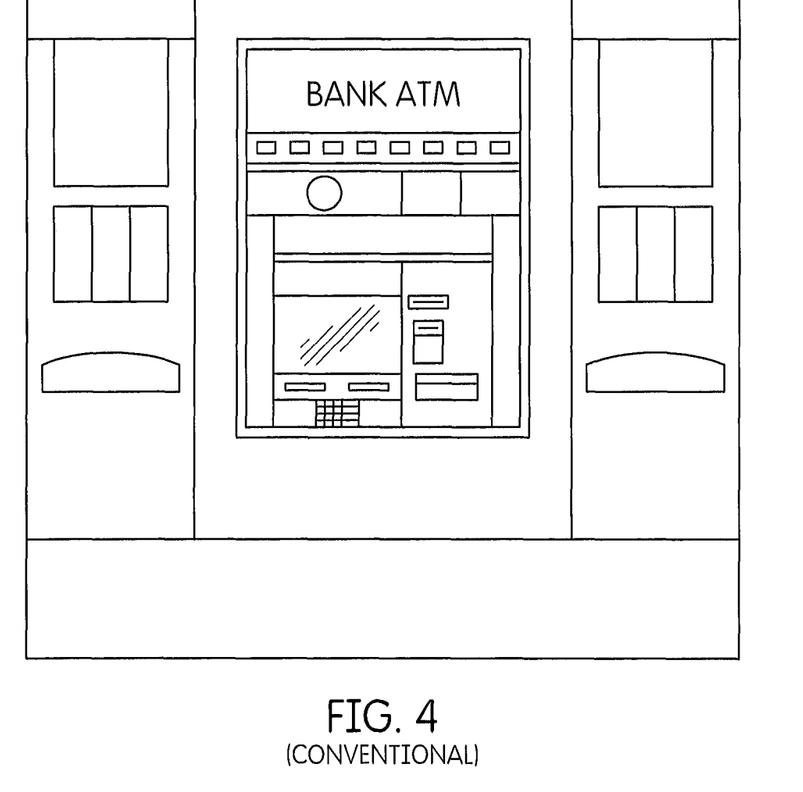
FIG. 4 depicts a conventional automated teller machine (ATM) that is configured to distribute a sheet of postage stamps such as the stamp shown in FIG. 1 upon payment with a credit card or debit card.

Many user or mailers still prefer to purchase a sheet of stamps. One can purchase stamps such as stamps 10 with a trip to the Post Office, have them delivered by mail, buy them at a supermarket, or more recently buy them at an Automated Teller Machine (ATM). FIG. 4 depicts a conventional ATM that is configured to distribute a sheet of stamps (e.g., stamp 10) upon payment with a credit card or debit card.

In all the above cases, the stamps sold presently are conventional stamps such as stamp 10. However, many of these venues would prefer to print stamps on demand to eliminate inventory and security issues.

In order to cure the above and other deficiencies of prior vending systems, a system and method to retrieve large volumes of indicia relatively quickly is provided so that the end-user transaction can be expeditiously handled, even during heavy traffic times such as around the end of the year holidays.

SUMMARY OF THE INVENTION

An aspect of the present invention is to provide a method of retrieving a plurality of indicia. The method includes receiving, by a computer system associated with a postage provider a request from a user, the request including a number of the plurality of indicia, and a monetary value of each of the plurality of indicia; authenticating, by the computer system, the request; and verifying, by the computer system, whether sufficient funds exist in an account of the user for the number and monetary value of the plurality of requested indicia. If the request is found authentic by the computer system and the computer system determines that sufficient funds exist in the account of the user for the number and monetary value of the requested indicia, extracting, by the computer system, the plurality of indicia. The method further includes assembling, by the computer system, in a return message the plurality of indicia as at least one binary data message; and transmitting, by the computer system, the at least one assembled binary data message to a computer associated with the user.

Another aspect of the present invention is to provide a method for retrieving a plurality of indicia. The method includes retrieving by a computer system associated with a postage distributor from a computer system associated with a postage provider, a plurality of indicia; receiving, by the computer system associated with the postage distributor, a request to purchase one or more indicia in the plurality of indicia from a user, the request including a number of indicia, and a monetary value of each indicium; and authenticating, by the computer system associated with the postage distributor, the request. The method further includes providing, by the computer system associated with the postage distributor, the requested one or more indicia to the user.

A further aspect of the present invention is to provide a system for providing a plurality of indicia. The system includes a computer system associated with a postage provider configured to: (a) receive a request from a user, the request including a number of the plurality of indicia, and a monetary value of each of the plurality of indicia; (b) authenticate the request; (c) verify whether sufficient funds exist in the account for the number and monetary value of the plurality of requested indicia; (d) extract the plurality of indicia, if the request is found authentic and the computer system determines that sufficient funds exist in the account for the number and monetary value of the requested indicia; (e) assemble in a return message the plurality of indicia as at least one binary data message; and (f) transmit the at least one assembled binary data message to a computer associated with the user.

Yet, another aspect of the present invention is to provide a system for providing a plurality of indicia. The system includes a computer system associated with a postage distributor configured to: (a) retrieve a plurality of indicia from a computer system associated with a postage provider; (b) receive a request to purchase one or more indicia in the plurality of indicia from a user, the request including a number of indicia, and a monetary value of each indicium; (c) authenticate the request; and (d) provide the requested one or more indicia to the user.

Although the various steps of the method of providing or printing postage stamps are described in the above paragraphs as occurring in a certain order, the present application is not bound by the order in which the various steps occur. In fact, in alternative embodiments, the various steps can be executed in an order different from the order described above or otherwise herein.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF EMBODIMENTS OF THE INVENTION

In one embodiment, a method is provided for accelerating a postage transaction. The postage transaction includes a single communication transaction which requests a plurality of indicia to be provided in a single response message. For example, in one embodiment, a request for "N" indicia of identical value, where "N" is an integer number greater than two can be performed. However, as it can be appreciated, this can be easily extended to requesting a group of indicia of varying values. In one embodiment, a Post Office point of sale machine, a bank ATM, or any other vending machine may be configured to dispense sheets of peel-and-stick stamps while providing for an accelerated postage transaction environment. The method can further provide for an increased speed printing of the sheets of stamps, at the home or office, which can enhance the overall customer-experience of the user.

Figure 2:
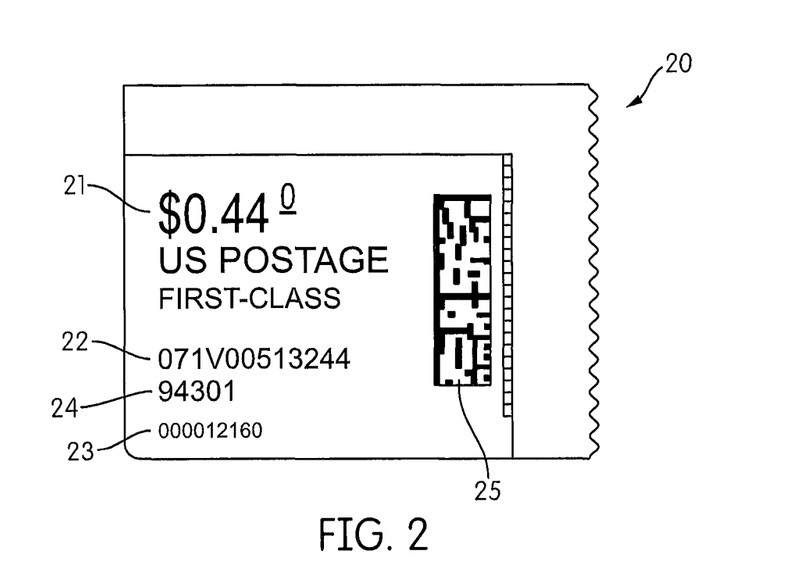
FIG. 2 shows a serialized postage stamp, according to an embodiment of the present invention.

FIG. 2 shows a serialized postage stamp 20, according to an embodiment of the present invention. The serialized postage stamp 20 includes a monetary value 21 (e.g., $0.44) and an account number 22 (e.g., "071V00513244") assigned to a user by a postage vendor. The account number 22 (e.g., "071V00500361") can contain the postage provider's number "07", the model number "1V" of an application program used to print the postage stamp 20 and the account number "00500361" of the user that printed the postage stamp 20. The serialized postage stamp 20 further includes a serial number 23 (e.g., "00012160") that is assigned to the serialized postage stamp 20 by the postage vendor. The serial number 23 is assigned to stamp 20 created using account number 22. In a typical internet based postage system, a given account associated with account number 22 can have up to 4.2 billion unique serial numbers. The serialized stamp 20 may further include an origination ZIP code 24 (e.g., "94301") indicating the place of origin of the stamp 20. In addition, the serialized postage stamp 20 also includes a barcode 25 that contains, for example, the amount of postage, the date it was created, the account number 22 from which it was created, and the serial number 23 of the stamp 20 within the account number 22.

The fact that each stamp 20 is serialized provides additional benefits. Another benefit is that the stamps 20 can be printed in a distributed manner and "on demand." Hence, none of the transportation security measures are needed. Re-use of stamp 20 can easily be detected as 95% or more (with a 100% scan rate in the immediate future) of the barcodes 25 on stamps 20 are currently scanned by the U.S. Postal Service (USPS) during the delivery cycle. The uniqueness of the stamp 20 quickly identifies attempted counterfeits using a highly automated system.

Figure 3:
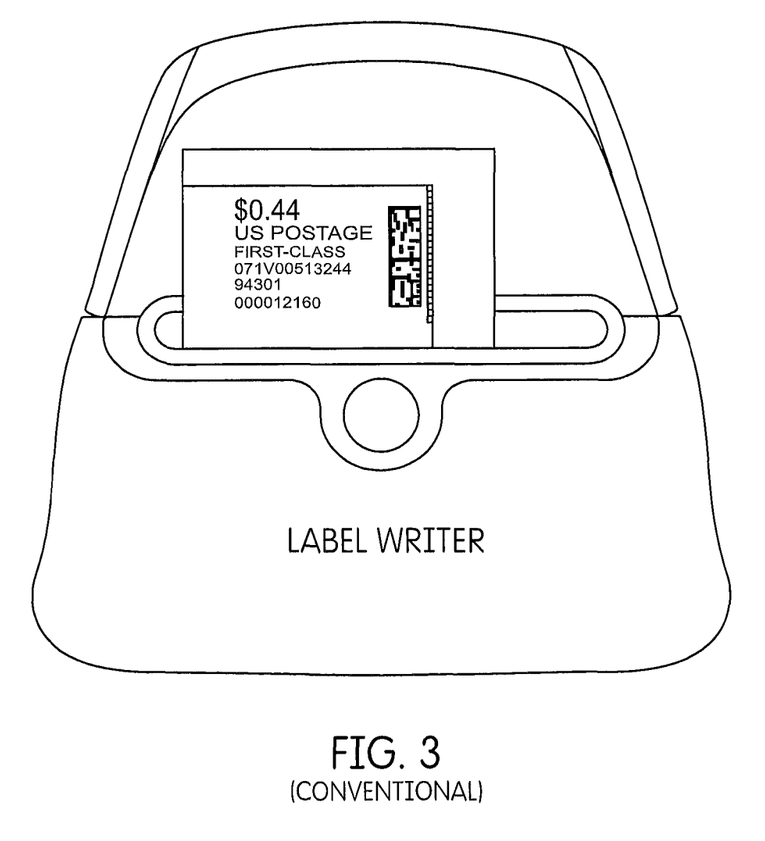
FIG. 3 depicts a conventional DYMO 450 printer for printing the stamp shown in FIG. 2.

For low volume, on-demand stamp printing situations, a small printer such as the DYMO 450 provides an excellent solution. FIG. 3 depicts a conventional DYMO 450 for printing stamp 20. A simple application can render stamp 20 within 4 to 5 seconds of the user starting the application. About 2 seconds is required for the communication to and from the internet postage provider.

Figure 5:
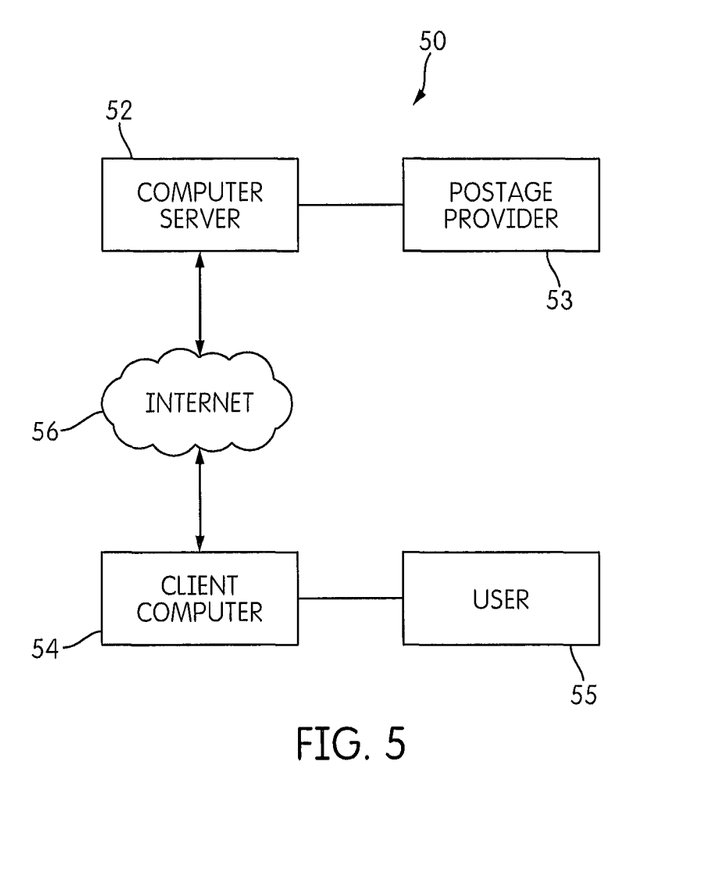
FIG. 5 depicts a flow chart of a configuration of a system for providing indicia, according to an embodiment of the present invention.

FIG. 5 depicts a flow chart of a configuration of a system 50 for providing indicia, according to an embodiment of the present invention. The system includes a computer system (e.g., computer server) 52 associated with a postage provider 53. In the following paragraph the computer system 52 is described as a computer server. However, as it can be appreciated the computer system 52 can be any computer platform, a computer server, a networked computer in a distributed computing environment, etc. The computer system can include one or more processors. The system 50 further includes a client computer 54 associated with a user 55. In one embodiment, the computer server 52 communicates with the client computer 54 through the internet 56. However, as it can be appreciated any other means of communication can be used. For example a dedicated line or a wireless cellular network can be used instead or in addition to the internet.

In one embodiment, a method for retrieving a plurality of indicia relatively quickly is provided. The method includes creating a modified message structure to computer server 52 associated with the internet postage provider 53 at a client computer 54 associated with the user 55. The modified message structure requests a plurality of indicia in a request, the request including an account of the user, a password of the user, a number of indicia, and a monetary value associated with each indicium. The method further includes receiving by a computer server 52 associated with the postage provider 50 the request through the internet 56. The method further includes, authenticating, by the computer server 52, the account and the password in the request. The method also includes verifying, by the computer server 52, whether sufficient funds exist in the account for the number and value of indicia requested. If the account and password are found authentic by the computer server 52 and the computer server 52 determines that sufficient funds exist in the account for the number and value of indicia requested, extracting by the computer server 52 the plurality of indicia having the requested value. The method also includes assembling by the computer server 52 in a return message the plurality of indicia as a binary data message. In one embodiment, the binary data message includes approximately 100 bytes for each of the plurality of indicia. In one embodiment, the plurality of indicia are assembled as a binary message using protocols such as extendible markup language (XML). The method further includes transmitting the assembled binary data message containing the plurality of indicia (e.g., through the internet) to the client computer 54 associated with the requesting party, i.e., the user 55. In one embodiment, the method may further include printing, by the computer 54 associated with the user 55, one or more indicia in the plurality of indicia.

Figure 6:
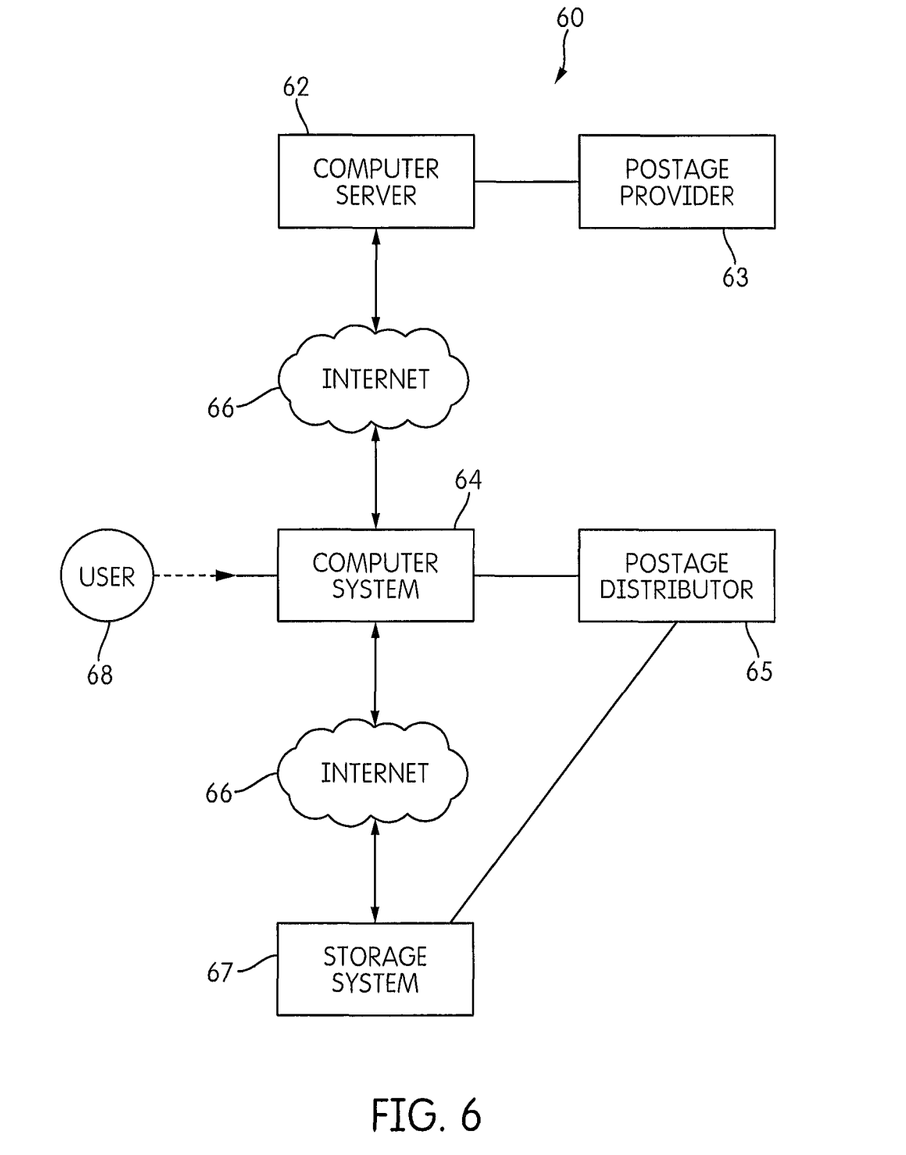
FIG. 6 depicts a flow chart of a configuration of a system for providing indicia, according to another embodiment of the present invention.

FIG. 6 depicts a flow chart of configuration of a system 60 for providing indicia, according to another embodiment of the present invention. The system includes a computer system (e.g., computer server 62) associated with a postage provider 63. In the following paragraph the computer system 62 is described as a computer server. However, as it can be appreciated the computer system 62 can be any computer platform, a computer server, a networked computer in a distributed computing environment, etc. The computer system can include one or more processors. The system 60 further includes a computer system 64 associated with a postage distributor 65. The computer system 64 can be any computer platform such as a computer server, a personal computer, a tablet, an automated teller machine (ATM), etc. The computer system 64 may have one or more processors. In one embodiment, the computer server 62 communicates with the computer system 64 through the internet 66. However, as it can be appreciated any other means of communication can be used. For example a dedicated line or a wireless cellular network can be used instead or in addition to the internet. The system further includes a storage system 67 associated with the postage distributor 65. The storage system 67 communicates with the computer system 64 through internet 66. However, as stated above, another means of communication can also be used instead or in addition to the internet, such as a direct or dedicated line or a wireless cellular network. The computer system 64 is configured to dispense postage indicia to user 68, as will be described further in detail in the following paragraphs.

In another embodiment, another method for retrieving a plurality of indicia relatively quickly is provided. The method includes "pre-harvesting" or retrieving, by the computer system 64 associated with the postage distributor 65 from a computer server 62 associated with a postage provider 63, a plurality of indicia and storing the plurality of indicia in a secure database in a storage system 67. The postage distributor 65 can be, for example, a bank, a financial institution, a post office, retail (e.g., supermarket), a restaurant, a hotel, etc. The method further comprises receiving a request for one or more indicia in the plurality of retrieved or pre-harvested indicia from the user 68, the request comprising credentials of the user including an identification (e.g., a credit card, debit card, etc.) and a passcode and a number of indicia and a monetary value of each indicium. The method further includes verifying or authenticating, by the computer system 64 associated with the postage distributor 65, the credentials of the user and accessing or retrieving the one or more indicia, by the computer system 64. The method further comprises providing by the computer system 64 associated with the postage distributor 65 the one or more indicia to the user 68.

This approach may provide benefits in that the pre-harvesting can be done during off-hours. The pre-harvesting involves the most time consuming aspect of the indicium creation (e.g., the assembly and digital signature of the indicium). By performing the pre-harvesting ahead of time, the time-consuming operations are eliminated and replaced with a simple, fast database access operation. In addition, the pre-harvesting avoids service interruptions due to routine system maintenance or unexpected outages. Indeed, it is customary for most web-based businesses to go off line for several pre-announced hours per month to perform system maintenance. By having the indicia pre-harvested and available on a computer server un-impacted by the service outage or maintenance, indicia printing can be offered every day of the year, twenty four hours per day.

In one embodiment, the pre-harvesting by the computer system 64 associated with the postage distributor 65 the plurality of indicia includes downloading from the computer server 62 associated with the postage provider 63 the plurality of indicia. In one embodiment, the pre-harvesting includes requesting by the computer system 64 associated with the postage distributor 65 the plurality of indicia from the computer server 62 associated with the postage provider 63. In one embodiment, the requesting includes sending an account number and a password associated with the postage distributor 65, a number of requested postage indicia, a monetary value of the plurality of postage indicia to the computer server 62 associated with the postage provider 63.

For example, the postage distributor 65 such as a financial institution or bank (collectively "BANK"), retail, a restaurant, a hoteal, or a post office can use postage indicia technology, such as Endicia technology. In one embodiment, a .NET C# Postage Class employed in USPS-approved clients such as DYMO Stamps and Endicia Label Server (ELS) can be used by the postage distributor (e.g., the BANK). The postage class utilizes USPS-approved messaging protocols to buy postage, create indicia, and obtain account status.

In one embodiment, the computer system 64 (e.g., the BANK) can pre-harvest a predetermined number of indicia (e.g., 10800, which is for 900 sheets of 12 indicia) and store the indicia on the secure BANK computer server or storage system 67. The "pre-harvested" indicia can be seen as an "inventory stock" of indicia. The rational for this "inventory stock" of indicia images is twofold. First, the computer system (e.g., ATM) 64 associated with the postage distributor (e.g., the BANK) 65 are configured to provide service twenty four hours a day, seven days a week, every day of the year. The computer server 62 associated with the postage provider (e.g., Endicia Label Server ELS) 63 may go off-line for a period of time (e.g., hours, etc.) for routine maintenance. Second, the indicium printing process performed the computer system 64 associated with the postage distributor 65 can be done quickly.

The process of contacting the computer server 62 associated with the postage provider (e.g., ELS) 63 from each computer system (e.g., ATM) 64 associated with the postage distributor 65 repeatedly in separate distinct times to retrieve indicia (e.g., a binary stream of data) for a sheet of stamps may incur undesirable delays, such as about 25 seconds, due to normal internet latency. However, by providing a repository of stored binary data streams (e.g., each binary stream having around 20 bytes) on the storage system 67 associated with the postage distributor (e.g., BANK) 65 and in communication with each computer system (e.g., ATM) 64, the plurality of indicia (e.g., indicium images or indicium data) can be accessed by an XML call by the computer system (e.g., ATM) 64. As indicia are consumed by ATM transactions, the binary data associated the printed indicia are deleted or marked as such in the storage system 67 associated with the postage distributor (e.g., BANK) 65.

As it can be appreciated, this method offers a more auditable and traceable mechanism to dispense postage indicia. For example, the postage distributor (e.g., BANK) 65 through the computer system (e.g., ATM) 64 records the account number of each customer who buys stamps, and these purchase events (e.g., the account number of the user) can be linked to the serial numbers of purchased indicia issued in that transaction. Therefore, an individual postage indicium can be tracked to a specific purchaser, based on the serial number and records tracking maintained by the postage distributor (e.g., BANK) 65. This level of security and tracking provides benefits over the issuance of conventional, un-serialized postage stamps.

In addition, bulk purchasing of postage by the postage distributor (e.g., the BANK) 65 from a postage provider (e.g., ENDICIA) 63 can be implemented using postage provider's "Buy Postage" messaging protocol or a newly generated messaging protocol, as desired. The creation or harvesting of indicia (e.g., in the form of binary data) can be implemented using a .NET postage class, or other programmed implementation, such as may be provided by the postage provider (e.g., ENDICIA) 63. Any predetermined number of indicia binaries can be stored on a secure database within storage system 67 (or elsewhere, in a local dedicated or distributed computing environment) associated with the postage distributor (e.g., a BANK) 65 and in communication with the computer system (e.g., ATM) 64 associated with the postage distributor (e.g., the BANK) 65 that is configured to dispense postage indicia to the user or consumer 68.

In response to a request of purchasing a predetermined number of indicia by consumer or user 68 from the computer system (e.g., ATM) 64, indicia are drawn from the storage system 67 associated with the postage distributor (e.g., the BANK) 65 via a secure hypertext transfer protocol (HTTPS) transaction from the computer system (e.g., ATM) 64. Upon finalizing the transaction, i.e., purchase of indicia, and transferring funds from a user's bank account or credit card account to the account of the postage distributor (e.g., the BANK) 65 associated with the computer system (e.g. ATM) 64, the computer system (e.g., ATM) 64 can then print the image or images of the purchased one or more indicia onto a substrate (e.g., paper) and dispensed to the user 68. The binary records associated with the purchased indicia are then deleted from the storage system 67.

In the following paragraphs, an example of an implementation of a process flow according to an embodiment of the present invention is provided. However, as it can be appreciated, other process flows can be implemented as desired depending on a particular application.

In this example, the postage distributor (e.g., the BANK) 65 creates an account at the postage provider (e.g., ENDICIA) 63 and funds the account using Automated Clearing House (ACH) credentials. The postage distributor (e.g., the BANK) 65 can use programming (e.g., .NET C# Postage Class) from the postage provider (e.g., ENDICIA) 63 to harvest or retrieve an initial predetermined number of indicia (e.g., 10800, which would be enough for 900 sheets of 12 indicia). The harvested or retrieved indicia can be stored on a secure database in storage system 67 associated with the postage distributor (e.g., BANK) 65. The database can be locally or remotely from the computer system (e.g., ATM) 64 that is configured to dispense postage to the user 68.

The postage distributor (e.g., the BANK) 65 creates a .NET web service (or other programmed implementation) linked to an indicium database associated with the postage provider (e.g., ENDICIA) 63. The indicium database is configured to retrieve a predetermined number of unused indicia binary data (e.g., 12 indicia at around 20 bytes each, etc.), in a single authenticated request, and supply the indicia binary data to the requesting computer system (e.g., ATM) 64 that is associated with the postage distributor (e.g., the BANK) 65.

As customers or users request to purchase a sheet of a plurality of indicia (e.g., 12 indicia), the computer system (e.g., ATM) 64 requests one or more blocks of a predetermined number of indicia (e.g., 12 indicia) via a Web service, or other programmed implementation, such as is described above. For example, in one embodiment, the transactions can be undertaken via HTTPS.

In one embodiment, the binary data or image data corresponding to the indicia (e.g., 12 indicia) printable on a single sheet is stored in a file. The file is labeled with a file name. Each file containing a plurality of indicia (e.g., 12 indicia) printable on a single sheet is labeled with a file name. In one embodiment, the file name can be, for example, the serial number of the lead indicium in the file (e.g., the serial number of one of the 12 indicia). Upon successful print completion of the indicia (e.g., 12 indicia) within a file, the file name can be recorded in an electronic journal of the computer system (e.g., ATM) 64 or the storage system 67 (e.g., local or remote from the computer system 64).

In one embodiment, the indicia printed can be either marked as "used" within the associated image file name or deleted from the computer system (e.g., ATM) 64 or from the storage system 67 (local or remote from the computer system) associated with the postage distributor (e.g., the BANK) 65.

In one embodiment, if the printing of the requested indicia by the ATM fails, the customer could handle the print failure by filing a Regulation for Electronic Fund Transfers (REG E) dispute claim, as would be performed for any ATM disputed transaction.

In some embodiments, application programs for performing methods in accordance with embodiments of the invention can be embodied as program products in a computer(s) such as a personal computer or computer server or in a distributed computing environment comprising a plurality of computers. The computer(s) may include, for example, a desktop computer, a laptop computer, a handheld computing device such as a PDA, etc. The computer program products may include a computer readable medium or storage medium or media having instructions stored thereon used to program a computer to perform the methods described above. Examples of suitable storage medium or media include any type of disk including floppy disks, optical disks, DVDs, CD ROMs, magnetic optical disks, RAMs, EPROMs, EEPROMs, magnetic or optical cards, hard disk, flash card (e.g., a USB flash card), PCMCIA memory card, smart card, or other media. Alternatively, a portion or the whole computer program product can be downloaded from a remote computer system or computer server via a network such as the internet, an ATM network, a wide area network (WAN) or a local area network.

Stored on one or more of the computer readable media, the program may include software for controlling both the hardware of a general purpose or specialized computer or processor. The software also enables the computer or processor to interact with a user via output devices such as a graphical user interface, head mounted display (HMD), etc. The software may also include, but is not limited to, device drivers, operating systems and user applications.

Alternatively, instead or in addition to implementing the methods described above as computer program product(s) (e.g., as software application products) embodied in a computer, the method described above can be implemented as hardware in which for example an application specific integrated circuit (ASIC) can be designed to implement the method or methods of the present invention.

Although the various steps of the method(s) are described in the above paragraphs as occurring in a certain order, the present application is not bound by the order in which the various steps occur. In fact, in alternative embodiments, the various steps can be executed in an order different from the order described above.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed is:

1. A method for facilitating reduction of delay related to postage indicia dispensing, the method being implemented by a postage distributor system associated with a postage distributor, the postage distributor system comprising a storage system, and one or more processors executing computer program instructions that, when executed, perform the method, the method comprising:

retrieving, by the postage distributor system, from a postage provider system associated with a postage provider, indicia data representing at least 1000 digitally-signed indicia;

storing, by the postage distributor system, the indicia data representing the at least 1000 digitally-signed indicia at the storage system;

receiving, by the postage distributor system, via a user device, a request to purchase one or more indicia subsequent to the storage of the indicia data representing the at least 1000 digitally-signed indicia at the storage system; and providing, by the postage distributor system, indicia data representing the requested indicia based on the postage distributor system's authentication of the request, wherein providing the indicia data representing the requested indicia comprises:

obtaining the indicia data representing the requested indicia from the indicia data representing the at least 1000 digitally-signed indicia stored at the storage system; and causing printing of a representation of the requested indicia.

2. The method according to claim 1, wherein the user device is communicatively connected to the storage system via a local area network, and wherein causing printing of the indicia data representing the requested indicia comprises transmitting the indicia data representing the requested indicia from the storage system to the user device via the local area network without the transmission occurring over the Internet.

3. The method according to claim 1, wherein the user device is communicatively connected to the storage system via the Internet, and wherein causing printing of the indicia data representing the requested indicia comprises transmitting the indicia data representing the requested indicia from the storage system to the user device via the Internet.

4. The method according to claim 1, wherein retrieving the indicia data representing the at least 1000 digitally-signed indicia comprises retrieving, from the postage provider system via the Internet, the indicia data representing the at least 1000 digitally-signed indicia, and wherein causing printing of a representation of the requested indicia comprises transmitting, from the storage system to the user device via a local area network, the indicia data representing the requested indicia such that the transmission does not occur over the Internet.

5. The method according to claim 1, wherein retrieving the indicia data representing the at least 1000 digitally-signed indicia comprises downloading the indicia data representing the at least 1000 digitally-signed indicia from the postage provider system.

6. The method according to claim 1, wherein both the receipt of the request from the external user device by the postage distributor system and the providing of the indicia data representing the requested indicia by the postage distributor system occur during a downtime period of the postage provider system.

7. The method according to claim 6, wherein the downtime period of the postage provider system is a time period during which the postage distributor system cannot retrieve any digitally-signed indicia from the postage provider system.

8. The method according to claim 1, wherein the postage distributor is a financial, institution, a bank, retail, a restaurant, a hotel, or a post office.

9. The method according to claim 1, wherein the user device is an automated teller machine external to the storage system of the postage distributor system.

10. A postage distributor system for facilitating reduction of delay related to postage indicia dispensing, the postage distributor system being associated with associated with a postage distributor and comprising:

a storage system;
one or more processors programmed with computer program instructions that, when executed, cause the one or more processors to:
retrieve, from a postage provider system associated with a postage provider, indicia data representing a plurality of digitally-signed indicia;
store the indicia data representing the plurality of digitally-signed indicia at the storage system;
receive, via a user device external from the storage system, a request to purchase one or more indicia subsequent to the storage of the indicia data representing the plurality of digitally-signed indicia at the storage system; and
provide indicia data representing the requested indicia to the user device based on the postage distributor system's authentication of the request,
wherein providing the indicia data representing the requested indicia comprises:
obtaining the indicia data representing the requested indicia from the indicia data representing the plurality of digitally-signed indicia stored at the storage system; and
causing printing of a representation of the requested indicia.

11. The postage distributor system of claim 10, wherein the user device is communicatively connected to the storage system via a local area network, and wherein causing printing of the indicia data representing the requested indicia comprises transmitting the indicia data representing the requested indicia from the storage system to the user device via the local area network without the transmission occurring over the Internet.

12. The postage distributor system of claim 10, wherein the user device is communicatively connected to the storage system via the Internet, and wherein causing printing of the indicia data representing the requested indicia comprises transmitting the indicia data representing the requested indicia from the storage system to the user device via the Internet.

13. The postage distributor system of claim 10,
wherein retrieving the indicia data representing the plurality of digitally-signed indicia comprises retrieving, from the postage provider system via the Internet, the indicia data representing the plurality of digitally-signed indicia, and
wherein causing printing of a representation of the requested indicia comprises transmitting, from the storage system to the user device via a local area network, the indicia data representing the requested indicia such that the transmission does not occur over the Internet.

14. The postage distributor system of claim 10, wherein retrieving the indicia data representing the plurality of digitally-signed indicia comprises downloading the indicia data representing the plurality of digitally-signed indicia from the postage provider system.

15. The postage distributor system of claim 10, wherein both the receipt of the request from the user device by the postage distributor system and the providing of the indicia data representing the requested indicia by the postage distributor system occur during a downtime period of the postage provider system.

16. The postage distributor system of claim 15, wherein the downtime period of the postage provider system is a time period during which the postage distributor system cannot retrieve any digitally-signed indicia from the postage provider system.

17. The postage distributor system of claim 10, wherein the user device is an automated teller machine external to the storage system of the postage distributor system.

18. A method for facilitating reduction of delay related to postage indicia dispensing, the method being implemented by a postage distributor system associated with a postage distributor, the postage distributor system comprising a storage system and one or more processors executing computer program instructions that, when executed, perform the method, the method comprising:
retrieving, by the postage distributor system, from a postage provider system associated with a postage provider, indicia data representing a plurality of digitally-signed indicia;
storing, by the postage distributor system, the indicia data representing the plurality of digitally-signed indicia at the storage system;
receiving, by the postage distributor system, via a user device external from the storage system, a request to purchase or print one or more indicia subsequent to the storage of the indicia data representing the plurality of digitally-signed indicia at the storage system; and
providing, by the postage distributor system, indicia data representing the requested indicia to the user device based on the postage distributor system's authentication of the request,
wherein providing the indicia data representing the requested indicia comprises:
obtaining the indicia data representing the requested indicia from the indicia data representing the plurality of digitally-signed indicia stored at the storage system; and
causing printing of a representation of the requested indicia.

19. The method of claim 18, wherein both the receipt of the request from the user device by the postage distributor system and the providing of the indicia data representing the requested indicia by the postage distributor system occur during a downtime period of the postage provider system, and
wherein the downtime period of the postage provider system is a time period during which the postage distributor system cannot retrieve any digitally-signed indicia from the postage provider system.

20. The method of claim 18, wherein the user device is an automated teller machine external to the storage system of the postage distributor system.

* * * * *